May 19, 1925.  
G. M. SCHROEDTER  
ANIMAL BLANKET  
Filed Oct. 10, 1924  
1,538,596
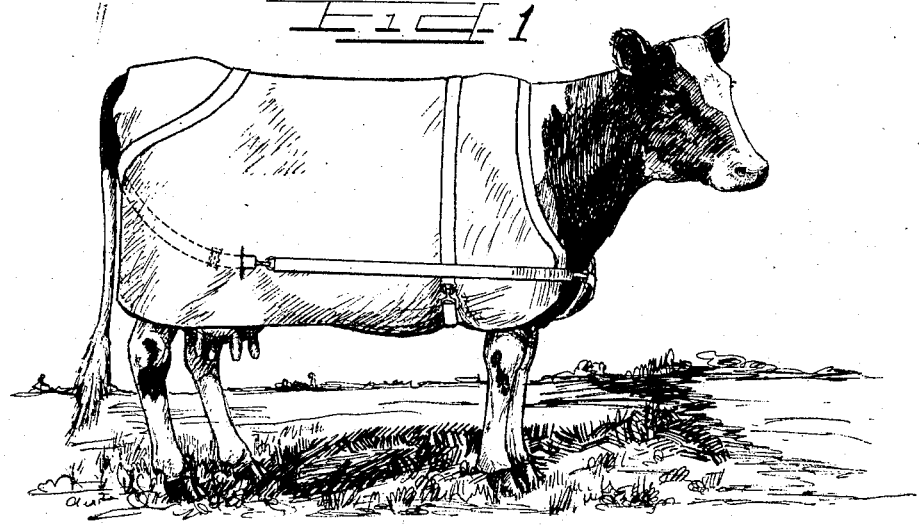
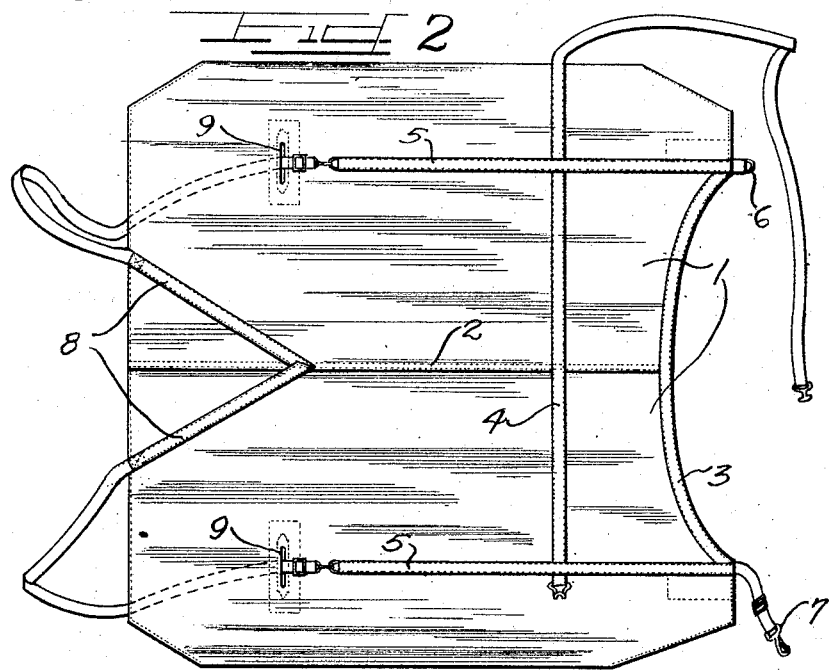
INVENTOR  
George M. Schroedter  
By Charles W. Hills  
Attys Patented May 19, 1925.

1,538,596

UNITED STATES PATENT OFFICE.

GEORGE M. SCHROEDTER, OF CHICAGO, ILLINOIS, ASSIGNOR TO WILLIAM COOPER AND NEPHEWS, A CORPORATION OF ILLINOIS.

ANIMAL BLANKET.

Application filed October 10, 1924. Serial No. 742,767.

*To all whom it may concern:*

Be it known that I, GEORGE M. SCHROEDTER, a citizen of the United States, and a resident of the city of Chicago, in the county of Cook and State of Illinois, have invented certain new and useful Improvements in an Animal Blanket; and I do hereby declare that the following is a full, clear, and exact description of the same, reference being had to the accompanying drawings, and to the numerals of reference marked thereon, which form a part of this specification.

This invention relates to blankets adapted to be placed on animals.

Various devices of this character have been proposed, more or less complicated in construction, awkward to apply and adjust and not well adapted to remain in position.

It is an object, therefore, of the present invention to provide a blanket simple in construction, easy to apply and retaining its position satisfactorily.

Other and further important objects of this invention will be apparent from the disclosures in the accompanying drawings and the following specification.

The invention (in a preferred form) is illustrated on the drawings and hereinafter more fully described.

On the drawings:

Figure 1 shows a cow with a blanket constructed in accordance with the present invention.

Figure 2 is a plan view of the blanket.

As shown on the drawings:

The blanket as illustrated comprises two pieces of material 1, 1 united by a seam 2 adapted to extend along the back of the animal At its forward end the blanket is cut away to fit the neck and shoulders of the animal and to strengthen this portion of the blanket a strip 3 of suitable reinforcing material may be secured along its margin.

Running transversely across the blanket, and stitched or otherwise secured thereto, is a strap 4 adapted to pass under the body of the animal as shown in Figure 1.

Other straps 5 extend longitudinally along each side of the blanket and are provided with suitable fastening means 6 and 7 so that these straps may be connected across the animal's chest.

From the center seam 2 straps 8 extend obliquely outwardly and rearwardly to the margin of the blanket. When the blanket has been laid on the animal the free ends of these straps are passed forwardly between the legs and then out through slots 9 in the blanket for attachment to the rear ends of the straps 5. These straps 8 cause the blanket to fit snugly around the rump and along the sides.

I am aware that numerous details of construction may be varied through a wide range without departing from the principles of this invention, and I therefore do not purpose limiting the patent granted otherwise than necessitated by the prior art.

I claim as my invention:

1. An animal blanket having straps adapted when in use to extend horizontally along the lower part of the sides of the animal and to be connected across the chest, other straps adapted to extend from the middle of the back of the animal diagonally downwardly and rearwardly to the margin of the blanket, around the legs, and then through openings in the blanket for attachment to the rear ends of said horizontal straps.

2. An animal blanket adapted to be held in place by only two lines of straps, one passing in a vertical plane around the body of the animal and the other passing around the chest, along the sides, between the legs and out over the rump.

In testimony whereof I have hereunto subscribed my name in the presence of two subscribing witnesses.

GEORGE M. SCHROEDTER.

Witnesses:
CARLTON HILL,
RENÉ WENDELL.